United States Patent [19]

Bell

[11] 3,911,276
[45] Oct. 7, 1975

[54] LASER SPECTROSCOPY
[75] Inventor: William E. Bell, Mountain View, Calif.
[73] Assignee: Diax Corporation, Sunnyvale, Calif.
[22] Filed: Oct. 18, 1974
[21] Appl. No.: 515,996

[52] U.S. Cl. .................. 250/343; 356/97; 356/204
[51] Int. Cl.² ........................................ G01J 1/00
[58] Field of Search ............ 250/339, 340, 343–346; 356/51, 97, 201, 204, 206

[56] References Cited
UNITED STATES PATENTS
3,805,074   4/1974   McCormack ...................... 250/339
3,820,901   6/1974   Kreuzer ............................ 250/345
3,831,030   8/1974   Wrobel et al. .................... 250/339

*Primary Examiner*—Davis L. Willis
*Attorney, Agent, or Firm*—Lowhurst, Aine & Nolan

[57] ABSTRACT

In laser spectroscopy, a sample medium to be analyzed, such as a gas, is interposed in a laser beam and the absorbance of energy by the sample from the laser beam is detected. In addition, the laser beam intensity is detected. A tuner is provided for tuning the wavelength of the laser beam over a plurality of discrete wavelengths to derive an absorbance spectrum of the sample under analysis. The dwell time for each of the various wavelengths of the laser beam is controlled so as to obtain equal watt-seconds of beam power at each of a number of wavelengths, whereby the sensitivity of the laser spectroscopy is normalized for the various wavelengths.

12 Claims, 3 Drawing Figures

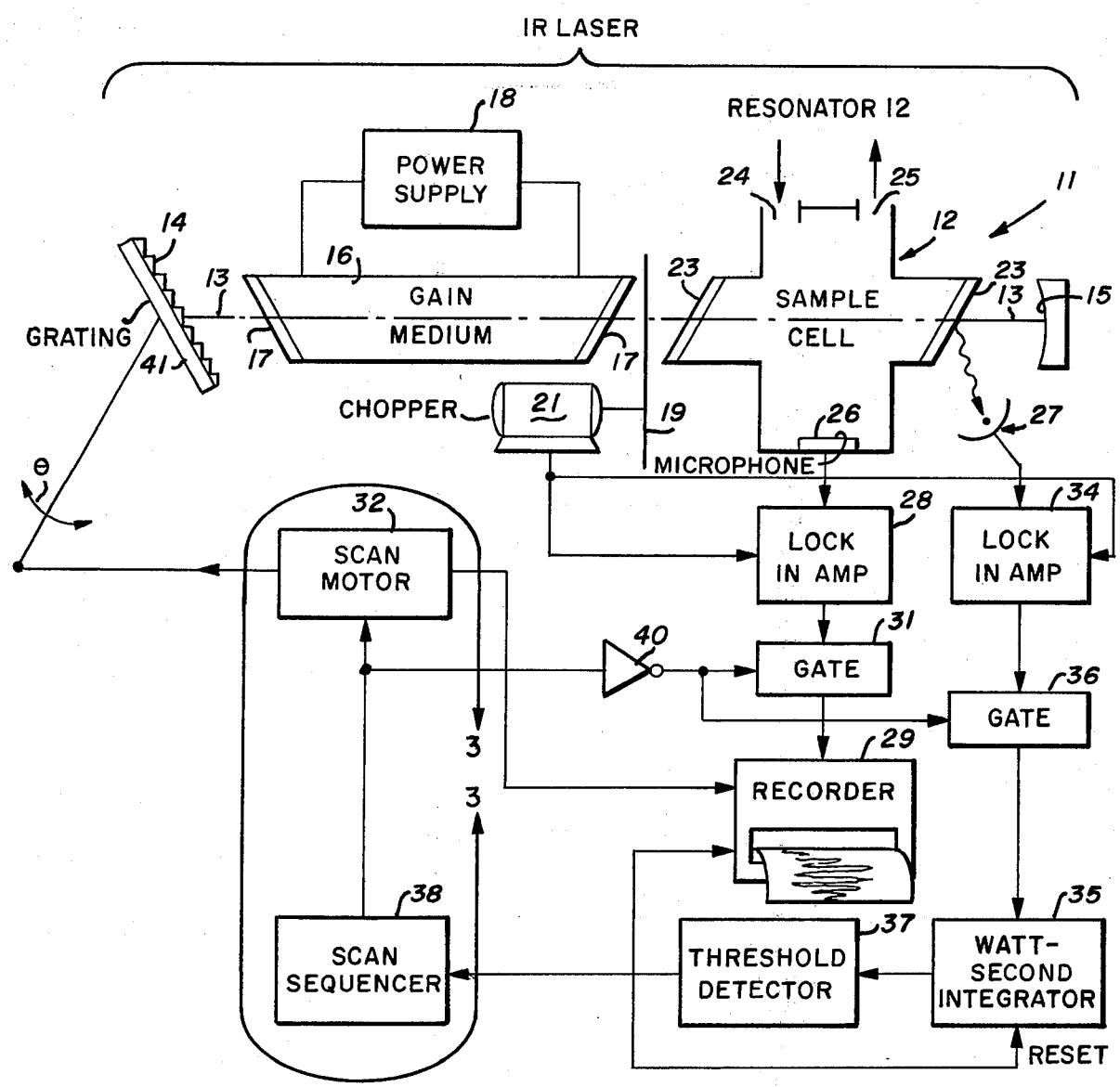
Fig_1
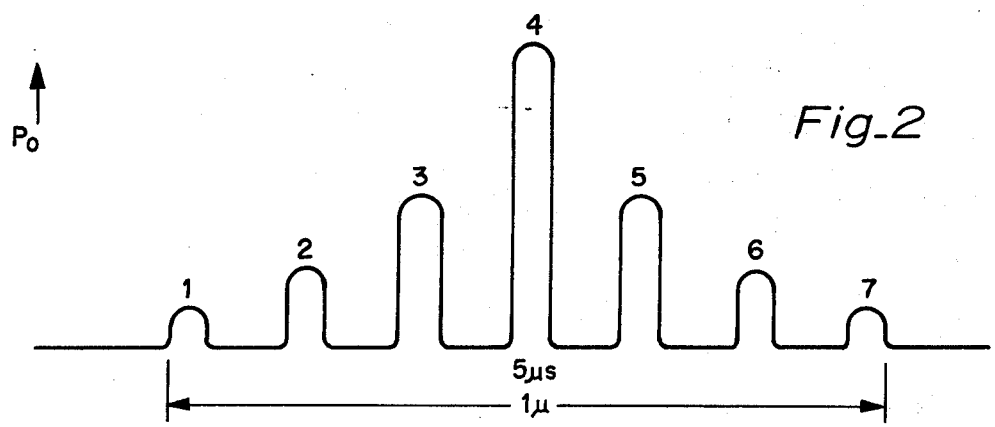
Fig_2

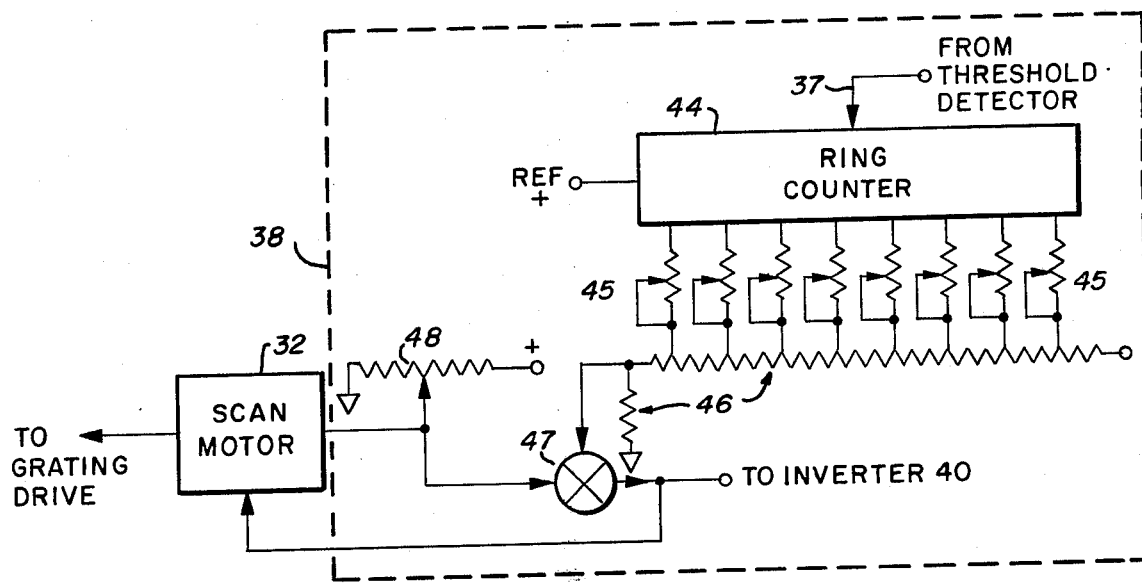
Fig_3

LASER SPECTROSCOPY

RELATED CASES

Inclusion of the sample cell within the laser cavity is disclosed and claimed in copending U.S. application Ser. No. 499,442, filed Aug. 22, 1974 and assigned to the same assignee as the present invention.

BACKGROUND OF THE INVENTION

The present invention relates in general to infrared laser spectroscopy.

DESCRIPTION OF THE PRIOR ART

Heretofore, infrared laser spectrometers have employed an infrared laser beam for irradiation of a sample to be analyzed. The absorbance of energy by the sample from the laser beam was detected as a function of the wavelength of the laser beam which was tunable in discrete wavelengths over a band of wavelengths of interest. The derived absorbance spectra are useful for analyzing sample substances such as gases and for identifying certain gaseous constituents such as pollutant gases in air. Spectrometers of this type are disclosed in the following references: U.S. Pat. No. 3,820,901 issued June 28, 1974; in an article titled "Laser Opto-Acoustic Spectroscopy: A New Technique of Gas Analysis" appearing in *Analytical Chemistry*, Vol. 46, No. 2, of February 1974, pages 239–244; in *Science*, Vol. 177, pages 347–349 of July 28, 1972 in an article titled "Air Pollution: Sensitive Detection of Ten Pollutant Gases by Carbon Monoxide and Carbon Dioxide Lasers;" and in U.S. Pat. No. 3,659,452 issued May 2, 1972.

In these prior art laser spectrometers, the infrared laser, which is preferably a relatively high power output carbon dioxide or carbon monoxide laser, produces an output laser beam which is tunable to selected wavelengths within a band of infrared wavelengths of interest, i.e., the band of wavelengths over which certain gaseous sample constitutents are known to have infrared absorption spectra. The laser output beam is directed through an optoacoustic cell containing the gaseous material to be analyzed. A sensitive microphone is coupled to the gaseous sample inside the sample cell. The laser beam is chopped at a certain chopping frequency, as of 25 Hertz, to produce a corresponding modulation of the absorbance, if any, of the laser beam energy by the sample under analysis. Absorption of energy from the laser beam by the gas produces heating thereof which results in generating an acoustic wave which is detected by the microphone. The detected signal is processed to produce an output signal as a function of the wavelength of the infrared energy of the tunable laser beam to derive an absorbance spectrum of the sample under analysis.

One of the problems encountered in these prior art spectrometers, is that the laser output beam power varies widely from one laser line (wavelength) to the next. Since the detected microphone signal amplitude is proportional to the incident infrared beam power and to the concentration of the absorbing gaseous constituent under analysis, an arrangement was provided for normalizing the detected signal amplitude to the intensity of the beam. More particularly, the detected signal amplitude was divided by the signal derived by measuring the beam power to derive a normalized output signal. While normalizing the detected signal to the beam power simplifies analysis of the output spectra, this method does not result in equal signal-to-noise ratio for the different tunable wavelengths of the spectrometer.

Therefore, it is desired to obtain a method and apparatus of laser spectroscopy wherein the individual line signals of the output spectra are normalized for sensitivity in such a manner that each line has equal signal-to-noise ratio.

SUMMARY OF THE PRESENT INVENTION

The principal object of the present invention is the provision of improved laser spectroscopy.

In one feature of the present invention, the sensitivity of a laser spectrometer is normalized by dwelling on each of the output laser lines in such a manner as to achieve irradiation of the sample at different wavelengths with a uniform watt-seconds of irradiation, whereby each of the detected line signals will have uniform signal-to-noise ratio.

In another feature of the present invention, the laser beam power is monitored and the watt-seconds thereof are integrated for each wavelength absorption measurement to be made. The watt-second integrator output is compared with a predetermined reference level to derive a control signal so that the dwell time for each wavelength of the laser is proportioned to achieve uniform watt-second irradiation of each of a number of different wavelengths, whereby a uniform signal-to-noise ratio is obtained.

In another feature of the present invention, the wavelength of the laser beam is stepped in discrete increments from one laser line to the next through a band of wavelengths of interest and the dwell times for each wavelength are inversely proportional to the intensity of the laser beam at any given wavelength, whereby uniform signal-to-noise ratio is obtained.

Other features and advantages of the present invention will become apparent upon a perusal of the following specification taken in connection with the accompanying drawings wherein:

BRIEF DESCRIPTION OF THE DRAWINGS

FIG. 1 is a schematic line diagram, partly in block diagram form, of a laser spectrometer incorporating features of the present invention, FIG. 2 is a plot of power output versus wavelength depicting the nonuniform power output as a function of wavelength for lasers incorporated in the apparatus of the present invention, and FIG. 3 is a schematic circuit diagram, partly in block diagram form, of a portion of the circuit of FIG. 1 delineated by line 3—3.

DESCRIPTION OF THE PREFERRED EMBODIMENTS

Referring now to FIG. 1 there is shown a laser spectrometer 11 incorporating features of the present invention. The spectrometer 11 includes an optical cavity resonator 12 defined by the optical beam path between a diffraction grating 14 and totally reflective mirror 15. An envelope 16 having Brewster angle windows 17 on opposite ends thereof contains a conventional gaseous gain medium, such as carbon monoxide, carbon dioxide, or a helium-neon mixture. The gain medium is interposed along the optical beam path 13 between the grating 14 and the mirror 15. The gain medium is excited by a suitable electrical discharge supplied with power from a power supply 18 to provide coherent stimulated emission of radiation at the resonant optical wavelength of the optical resonator 12.

The laser beam 13 is modulated in intensity by means of a rotatable perforated chopper disc 19 driven by a motor 21. An optoacoustic sample cell 12 is disposed in the modulated or chopped laser beam path 13. Brewster angle windows 23 are disposed on opposite ends of the sample cell 22. Sample gases to be analyzed are caused to flow through the sample cell 22 via inlet and outlet passageways 24 and 25. A microphone 26 is disposed in acoustic wave energy coupled relation with the gas within the sample cell 22. A power detector 27 is disposed to receive a small fraction, as of 0.1 to 1%, of the beam power reflected from the output Brewster angle window 23 of the sample cell 22. This Brewster angle window is slightly skewed relative to its position for substantial nonreflectivity for reflecting a portion of the beam to the detector 27.

In operation, each pulse of the chopped laser beam, which is incident on the sample gas at a wavelength corresponding to an absorption line of the sample material, produces absorption of power from the beam and consequent heating of the sample gas within the cell 22. Heating of the gas produces expansion of the gas and therefore an acoustic wave at the chopper frequency within the sample cell 22. The acoustic waves are picked up by the microphone 26 and fed to one input of a lock-in amplifier 28 for amplification and synchronous detection against a sample of the chopper frequency, as of 20–400 Hertz, derived from chopper 21. The amplified and detected output signal, which is a measure of the absorbance of the laser beam by the sample, is fed to one input of a recorder 29 via gate 31 for integration and recording as a function of the wavelength of the laser beam 13 as derived from an output of a scan motor 32 in a manner as more fully described below. Thus, the output of the recorder 29 is an absorbance spectrum of the sample under analysis.

Due to the varying intensity of the various output lines of the lasser beam 13 at different wavelengths, as shown in FIG. 2, the output spectra as recorded in recorder 29 would be difficult of analysis without means for compensating for the different power levels of the various laser lines employed for irradiation of the sample. Accordingly, the beam power signal, as derived from the output of the beam power detector 27, is fed to one input of a lock-in amplifier 34 for synchronous detection and amplification against a reference frequency derived from the chopper 21. The output of the lock-in amplifier 34 is fed to the input of a watt-second integrator 35 via a gate 36. The watt-second integrator 35 serves to integrate the power of the laser beam 13 as applied to the sample within the sample cell 22 for a given wavelength.

When the output of the watt-second integrator reaches a certain predetermined threshold value as detected and set by threshold detector 37 an output is derived which is fed to a scan sequencer 38 which causes the scan sequencer to tune the frequency of the laser beam via scan motor 32 to the next wavelength of interest. The scan motor 32 tunes the laser beam 13 by pivoting the diffraction grating 14 about a pivot point 41 to a predetermined angle $\theta$. When the laser is tuned to the next wavelength of interest an output is derived from the scan sequencer 38 which is inverted and fed to gates 31 and 36 for gating the output of the respective lock-in amplifiers 28 and 34 to the recorder 29 and watt-second integrator 35, respectively. The recorder 29 also includes an internal integrator which integrates the gated output signal of the lock-in amplifier 28. It is this integrated output that is recorded. This integrator is also reset by the reset output of the threshold detector 37.

The advantage of the laser spectrometer 11 over that of the prior art, wherein the detected signal amplitude was merely normalized to the beam power, is that each wavelength of radiation applied to the sample has the same number of watt-seconds or Joules so that the sensitivity of the spectrometer is normalized over the band of wavelengths of interest, thereby achieving uniform signal-to-noise ratio.

Another advantage of the spectrometer 11 of the present invention, as contrasted with the spectrometers of the prior art, is that the sample absorbance signal information rate is increased because the dwell time on any given line of the spectrum is only as long as necessary to obtain a uniform signal-to-noise ratio. Moreover, the reduction of the absorbance spectral data becomes less complicated because the absorbance signal data is compensated for signal-to-noise ratio.

Referring now to FIG. 3 there is shown a circuit for scan sequencer 38. More particularly, the output from the threshold detector 37 is fed to the input of a ring counter 44 for advancing the count in the ring counter 44 by one increment each time an output of the threshold detector 37 is obtained. Each output of the ring counter 44 is connected via an adjustable potentiometer 45 to the corresponding tap on a potential divider resistor network 46. A reference potential is applied to the ring counter 44 such that this reference potential is dropped through sequentially actuated potentiometers 45 and a sequentially increasing amount of resistance derived from the potential divider 46. The output of the potential divider 46 is fed to one input of an error detector 47 for comparison with an output voltage derived from potentiometer 48 coupled to the output drive of the scan motor 32 so that the potential as derived from the potentiometer 48 and fed to one input of the error detector 47 is proportional to the angular position of the grating 14 and thus the wavelength of the laser beam 13. The output of the error detector $\epsilon$ is fed to the scan motor 13 for providing a closed loop servo drive for the grating 14. Thus, the individual potentiometers 45 are set so that when that output of the ring counter 44 is actuated for applying the reference potential via the potentiometer 45 and the potential divider 46 to the one input of the error detector, the error signal will drive the scan motor to a certain desired predetermined wavelength laser line. When the error signal is a logic zero, indicating a null position, the laser is tuned to a certain predetermined laser line as determined by the true output of the ring counter 44. The error signal will be of zero amplitude at null which is thence fed via inverter 40 for actuation of the gates 31 and 36 so that timing of the watt-second integrator 36 can be initiated as well as timing for integration and recording of the detected absorbance signal.

What is claimed is:
1. In a laser spectrometer:
   laser means for producing a laser beam of coherent optical radiation;

sample cell means for interposing a sample medium to be analyzed in said laser beam;

detecting means for detecting the absorbance of energy, if any, by said sample medium from said laser beam;

power monitoring means for monitoring the laser beam power; and correlating means for correlating the laser beam power for a given wavelength with the time during which the sample is being irradiated and during which the sample absorbance is detected so that the sample is irradiated with a certain predetermined watt-seconds of beam power at a given wavelength during the detection of sample absorbance, whereby the sensitivity of the laser spectrometer is normalized at said given wavelength.

2. The apparatus of claim 1 including, tuning means for varying the wavelength of the coherent optical radiation of said laser beam from a first wavelength to a second wavelength, and wherein said correlating means correlates the watt-seconds of beam power irradiating said sample during detection of absorbance at both wavelenths so that said sample is irradiated with equal watt-seconds of beam power at both of said first and second wavelengths.

3. The apparatus of claim 1 wherein said laser beam is of an infrared wavelength.

4. The apparatus of claim 1 wherein said detecting means includes, acoustic detector means coupled in acoustic wave energy exchanging relation with the sample medium for detecting acoustic waves generated by the absorbance of laser beam energy by the sample medium.

5. The apparatus of claim 1 including, means for modulating the intensity of said laser beam.

6. The apparatus of claim 5 wherein said detecting means includes, means for synchronously detecting the absorbance of energy by the ample medium from said laser beam as a function of the modulation of the intensity of said laser beam.

7. In a method of laser spectroscopy the steps of:

interposing a sample medium to be analyzed in a laser beam;

detecting the absorbance of energy, if any, by said sample medium from said laser beam;

monitoring the laser beam power; and correlating the laser beam power for given laser beam wavelength with the time that the sample is being irradiated and during which sample absorbance is being detected so that the sample is irradiated with a certain predetermined number of watt-seconds of beam power at a given wavelength during the detection of sample absorbance, whereby the sensitivity of the laser spectroscopy is normalized at said given wavelength.

8. The method of claim 7 including the step of, varying the wavelength of the coherent optical radiation of said laser beam from a first wavelength to a second wavelength, and wherein the step of correlating the laser beam power includes correlating the watt-seconds of beam power irradiating the sample during detection of absorbance at both wavelengths so that said sample is irradiated with equal watt-seconds of beam power at both of said first and second wavelengths.

9. The method of claim 7 wherein said laser beam is of an infrared wavelength.

10. The method of claim 7 wherein the step of detecting the sample absorbance includes the step of, coupling an acoustic wave detector in acoustic wave energy exchanging relation with the sample medium for detecting acoustic waves generated by the absorbance of laser beam energy by the sample medium.

11. The method of claim 7 including the step of modulating the intensity of the laser beam.

12. The method of claim 11 wherein the step of detecting the sample absorbance includes the step of synchronously detecting the absorbance of energy by the sample medium from the laser beam as a function of the modulation of the intensity of said laser beam.

* * * * *